(No Model.) 2 Sheets—Sheet 1.

W. E. GEORGE & J. A. McGINNESS.
END GATE FASTENING.

No. 414,395. Patented Nov. 5, 1889.

WITNESSES
Jas. B. Clark
M. M. Martin

INVENTORS
W. E. George
J. A. McGinness
by E. H. Bates, Attorney (No Model.) 2 Sheets—Sheet 2.
W. E. GEORGE & J. A. McGINNESS.
END GATE FASTENING.
No. 414,395. Patented Nov. 5, 1889.
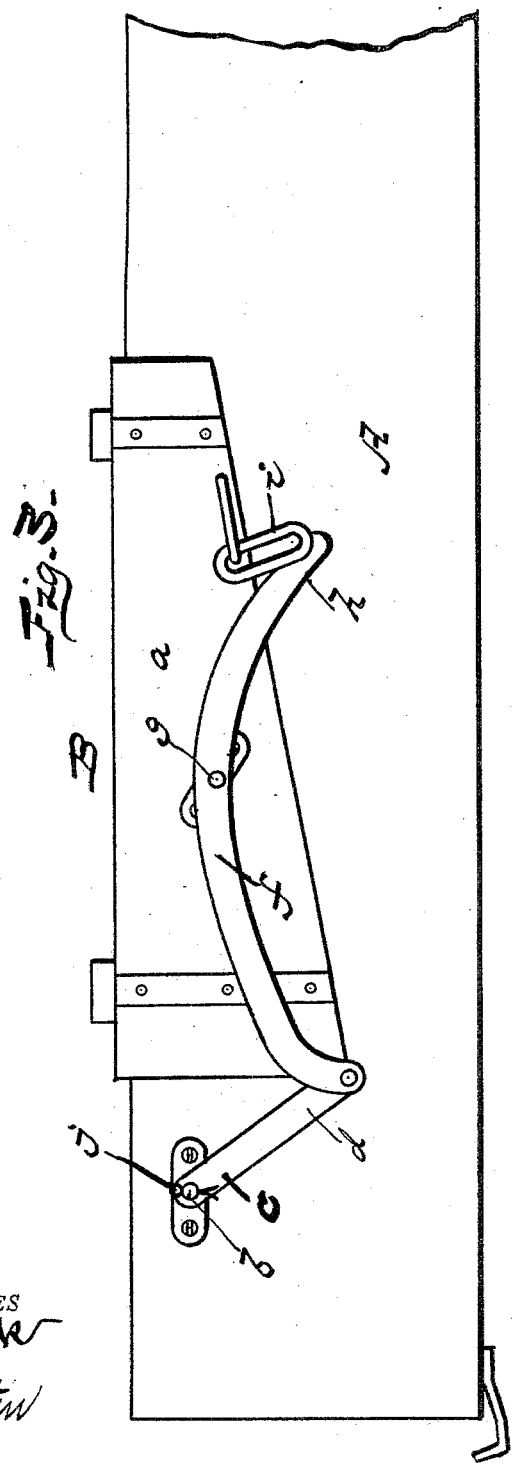
WITNESSES
Jas. B. Clark
M. M. Martin
INVENTORS.
W. E. George
J. A. McGinness
by E. H. Bates
Attorney

UNITED STATES PATENT OFFICE.

WILLIAM E. GEORGE AND JOHN A. McGINNESS, OF HARLAN, IOWA.

END-GATE FASTENING.

SPECIFICATION forming part of Letters Patent No. 414,395, dated November 5, 1889.

Application filed September 11, 1889. Serial No. 323,649. (No model.)

*To all whom it may concern:*

Be it known that we, WILLIAM E. GEORGE and JOHN A. McGINNESS, citizens of the United States, residing at Harlan, in the county of Shelby and State of Iowa, have invented certain new and useful Improvements in End-Gate Fastenings; and we do hereby declare the following to be a full, clear, and exact description of the invention, such as will enable others skilled in the art to which it appertains to make and use the same.

This invention relates to improvements in end-gate fastenings; and it consists in the novel construction, arrangement, and combination of parts, all as will be hereinafter fully described.

The annexed drawings, to which reference is made, fully illustrate our invention, in which—

Figure 1:
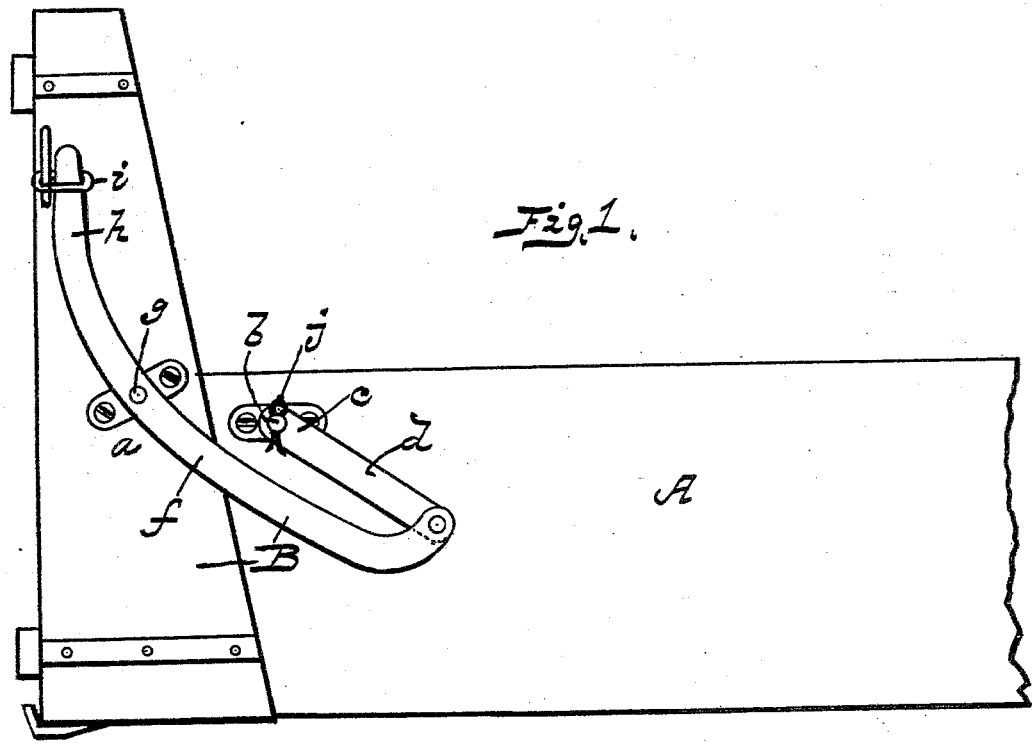
Figure 2:
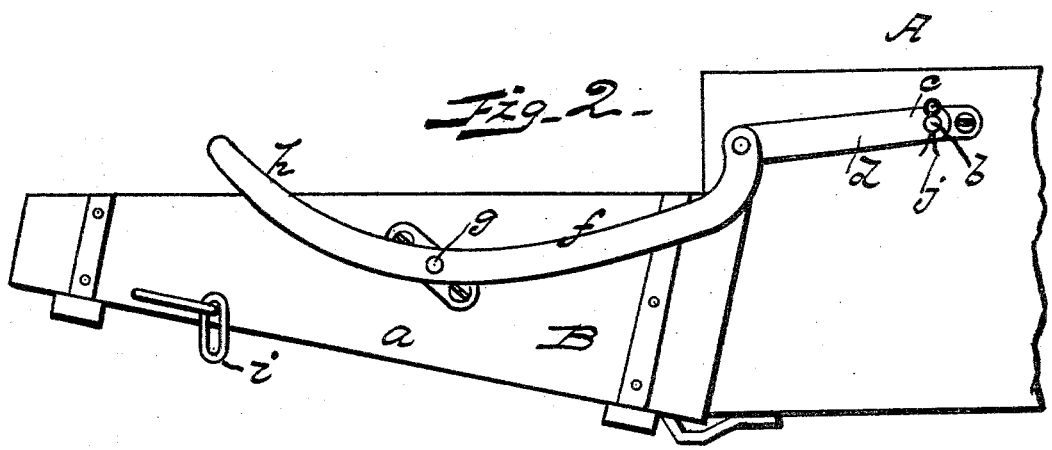

Figure 1 represents a side view of our device, showing the gate up or closed. Fig. 2 is a similar view showing the gate let down. Fig. 3 is a side view, also showing the gate adjusted, forming a seat for the wagon.

Referring by letter to the accompanying drawings, A designates a portion of a wagon-body, and B represents the end-gate therefor, having side pieces $a$. To the sides of the body we secure a pin or bolt $b$, to which is pivoted one end $c$ of a short bar $d$, the opposite end $e$ of which is in turn pivoted to the inner end of a curved lever or bar $f$. This bar is pivoted at $g$ to the side of the end-gate, and the extended end $h$ of said curved bar engages a ring or loop $i$, which is also attached to said end-gate, as shown in Fig. 1 of the drawings, whereby the gate is held firmly in place closed.

In lowering the gate the loop is detached from the curved arm, which allows the gate to descend to a position shown in Fig. 2.

Supporting-brackets for the lower end of the gate are secured to the rear of the body, as shown in the drawings.

By removing the spring-pin $j$ from the bolt $b$ the gate can be readily detatched from the body when desired.

Fig. 3 shows our device shifted in such a manner as to throw the gate upon the side-boards of the body, and which can be used as a seat for the wagon, and being out of the way when it is desired to load small stock. This device, it will be seen, is simple in operation, durable, and at the same time cheap to manufacture.

What we claim is—

The combination, with the body and gate, of the short arm $d$ and curved arm $f$, both pivoted to one another, as shown, and to the body and gate, the loop loosely connected to the gate and adapted to engage the free end of the curved bar when the gate is closed, substantially as described.

In testimony whereof we affix our signatures in presence of two witnesses.

WILLIAM E. GEORGE.
          JOHN A. McGINNESS.

Witnesses:
  R. T. BLAIR,
  A. H. SNYDER.